United States Patent [19]
Ramsey

[11] 3,755,662
[45] Aug. 28, 1973

[54] PHASE LIGHTING HEATER AND HEATER A/C CONTROL UNITS

[75] Inventor: Charles W. Ramsey, Niles, Ohio

[73] Assignee: General Motors Corporation, Detroit, Mich.

[22] Filed: July 14, 1971

[21] Appl. No.: 162,394

[52] U.S. Cl. .............................................. 240/8.16
[51] Int. Cl. .............................................. B60q 3/04
[58] Field of Search ........................... 240/8.16, 2.1; 296/37 R, 70

[56] References Cited
UNITED STATES PATENTS
2,613,630  10/1952  McNairy ........................ 240/2.1 X Primary Examiner—Donald O. Woodiel
Attorney—W. S. Pettigrew, K. H. MacLean et al.

[57] ABSTRACT

A temperature control indicator for an automobile heating system including a temperature selector lever extending through a slot in the automobile dashboard which is connected to means for varying the temperature output of the heating system. An elongated light filter extends along a parallel slot in the dashboard and is multi-colored along its length from a deep red to a deep blue to vary the color of light projected by a light source behind the dashboard into the passenger compartment. A lens is linked to the lever and moves with it along the filter for focusing the colored light as it is projected into the passenger compartment.

1 Claim, 5 Drawing Figures

PATENTED AUG 28 1973

3,755,662

INVENTOR.
Charles W. Ramsey
BY
K. H. MacLean, Jr.
ATTORNEY

3,755,662

PHASE LIGHTING HEATER AND HEATER A/C CONTROL UNITS

This invention relates to automobile heating systems with a visible temperature control indicator.

In prior automobile heating systems with temperature control indicators, it has been customary to utilize a movable member such as a wheel or lever with numerical graduations for manual setting of the desired temperature. Because of the variance in output temperature response of a typical automobile heating system, numerical settings are not particularly accurate to select a predetermined temperature. Secondly, the numerical settings are difficult to read at a glance. The present temperature control indicator includes a control lever movable along a slot in the dashboard. A remote light source behind the dashboard transmits light through an elongated light filter which is multi-colored to project differing colors as the lever is moved from one of its ends to the other. A lens is movable with the lever and along the filter to focus the colored light from the area of the filter adjacent the lever to provide a visual light which by its color and position indicates the position of the lever and the selected temperature setting of the heating system.

Therefore, an object of the present invention is to provide a temperature control indicator including a variable colored light indicator responsive to a desired setting of the temperature control.

A further object of the invention is to provide a temperature control indicator including a movable lever for affecting varying temperature inputs to the passenger compartment and a colored light indicator whose color is responsive to the position of the lever for transmitting a colored light signal to the automobile operator corresponding to the preselected temperature setting of the auto operator.

Further objects and advantages of the present invention will be apparent from the following description, reference being had to the accompanying drawings in which a preferred embodiment of the invention is clearly shown.

Figure 1:
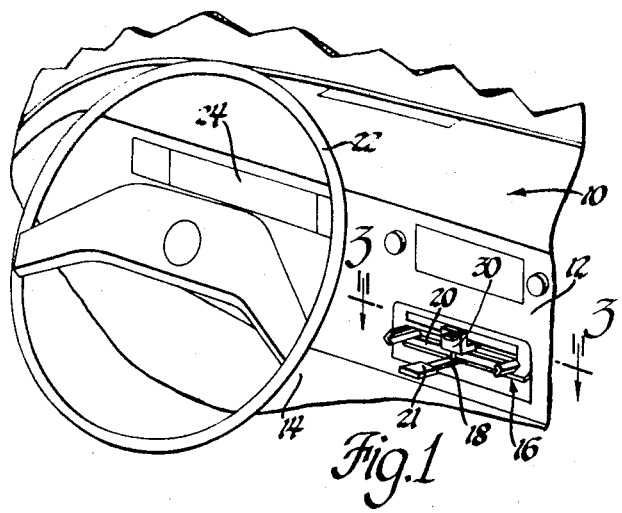
FIG. 1 is a perspective view of the automobile dashboard with the subject temperature control indicator.
Figure 2:
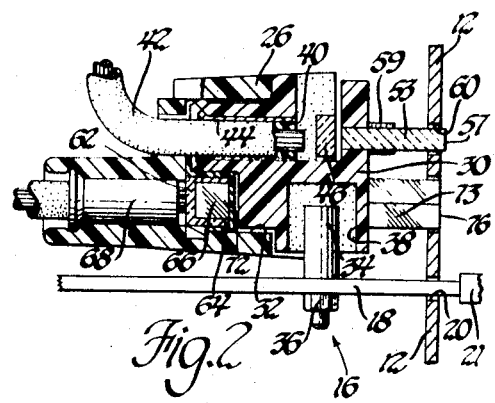
FIG. 2 is a vertical sectioned view of the temperature indicator taken along section line 2—2 in FIG. 4 and looking in the direction of the arrows.
Figure 3:
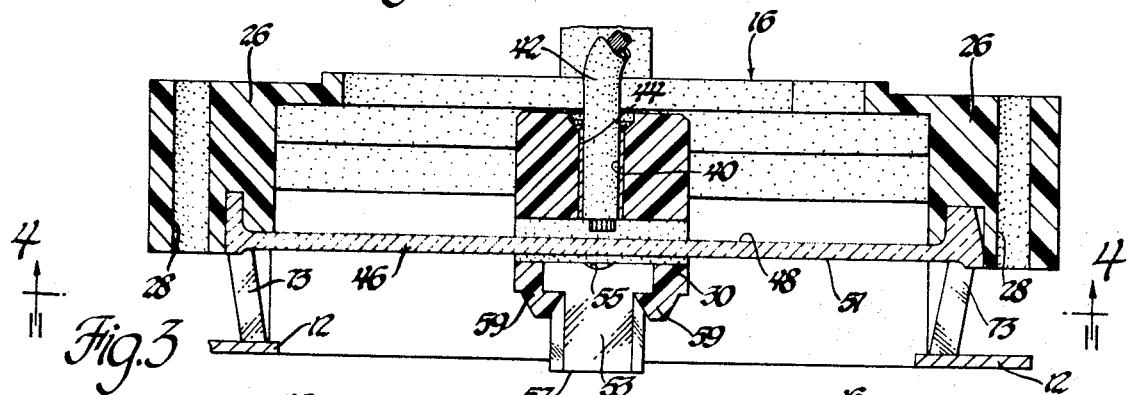
FIG. 3 is a horizontal sectioned view of the temperature indicator taken along section line 3—3 in FIG. 1 and looking in the direction of the arrows.

In FIG. 1 of the drawings, an automobile dashboard 10 is illustrated which includes a front surface 12 facing the passenger compartment 14. The subject temperature control indicator assembly 16 is mounted in the front surface 12 of the dashboard and includes a selector lever 18 which extends through an elongated slot 20 in the dashboard front surface 12. A knob 21 on the end of lever 18 is utilized to position the lever along the slot. A steering wheel 22 and speedometer 24 are also illustrated.

The temperature indicator 16 is better shown in FIGS. 2 through 5 and includes an elongated housing 26 which is adapted to be attached to supports (not shown) behind the dashboard by screw fasteners extending through bores 28. Housing 26 supports a slidable member extending mounted in a track 32 of housing 26. A pin 34 which is fastened to lever 18 by a nut fastener 36 extends into recess 38 in the member 30. This causes the member 30 to move along track 32 of the housing 26 with the lever 18 as it is moved from one end of slot 20 to the other. The member 30 has a bore 40 which supports one end of a fiber optic light wire 42. A sleeve 44 between the end of the light wire 42 and the member 30 aligns and secures the light wire within bore 40. The other end of the light wire 42 receives light from a lamp (not shown) fixedly mounted behind the dashboard 10.

Figure 4:
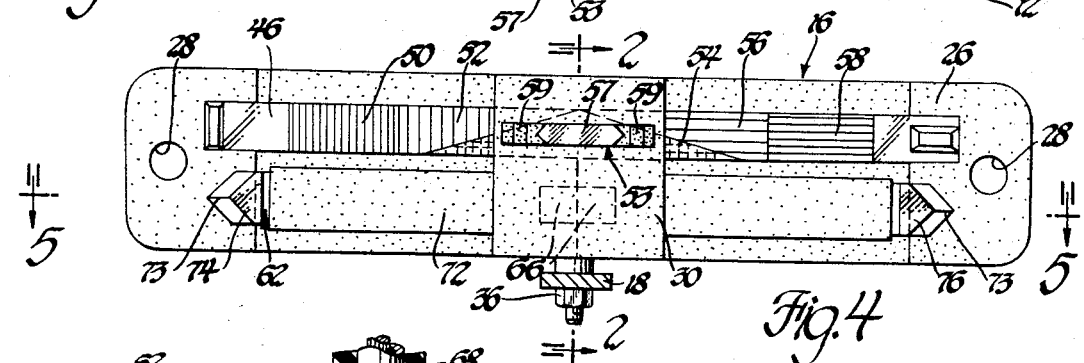
FIG. 4 is a vertical sectioned view of the temperature indicator assembly shown in FIG. 3 and looking in the direction of the arrows.

An elongated light filter 46 is supported at its ends in housing 26 parallel to slot 20 in face 12 of dashboard 10. The filter is of a clear acrylic plastic material with five areas on its back surface 48 hot-stamped with different colors in a pattern shown in FIG. 4. In FIG. 4, starting from the left, area 50 is a dark red, area 52 a light red, area 54 an amber color, area 56 a light blue color and area 58 a dark blue color. The boundaries between areas 52, 54 and 56 are angled as shown in FIG. 4 to effect a desirable blend of colors as the end of the fiber optic wire 42 moves from the left to the right with member 30 and lever 18. The color varies from a deep red at the left end to a lighter red, to a yellow, to a brown and then to a light blue and finally to a dark blue as the member 30 and lever 18 are moved to the right in slot 20. The light is transmitted from the light source (not shown) through the fiber optic light wire 42 against the back surface 48 of filter 46. This causes a colored light to be emitted from the front surface 51 of the filter member 46.

A lens 53 is supported on the slidable member 30 by tabs 59 and is movable with it and the end of the fiber optic light wire 42 along the filter 46 with the lever 18 as it is moved from one end of the slot 20 to the other. A spherical cavity 55 in the rear face of lens 52 which is adjacent surface 51 of the filter distributes the colored light from the filter evenly throughout the lens 53. The colored light is emitted from the front face 57 of the lens 53 to visually indicate the position of lever 18 and the temperature setting. The lens 53 is of clear acrylic plastic material. End 57 of lens 53 extends through a slot 60 in surface 12 of dashboard 10 which is parallel with slot 20.

Figure 5:
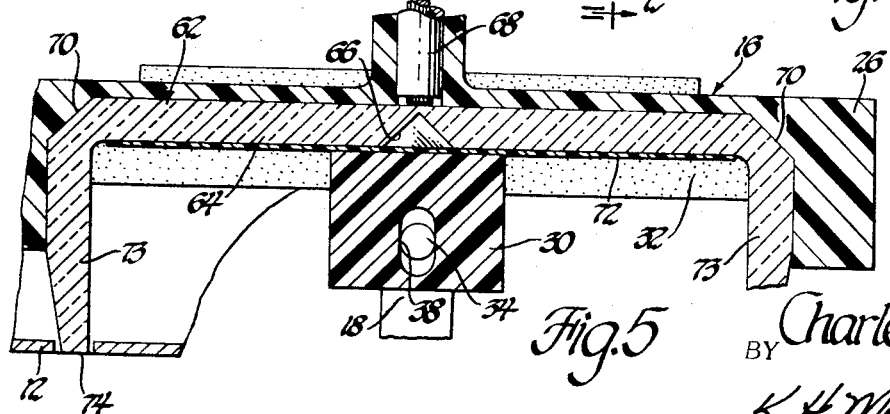
FIG. 5 is a horizontal sectioned view of the indicator assembly taken along section line 5—5 in FIG. 4 and looking in the direction of the arrows.

An elongated end pointer lens member 62, shown in FIGS. 4 and 5, marks the end positions to which lever 18 may be pivoted in slot 20. Lens 62 includes a light transmitting mid-portion 64 extending parallel to the filter 46 but spaced therefrom. Reflecting surfaces 66 located centrally in lens portion 64 reflect light from a second fiber optic light wire 68 axially in both directions against reflecting surfaces 70. A liner member 72 prevents reflected light from escaping from the portion 64. The reflecting surfaces 70 are hot-stamped dark red on the right and dark blue on the left. The surfaces 70 reflect the light from portion 64 rearward into the passenger compartment through leg portions 73 of the lens 62. This causes end surfaces 74 and 76 which project through openings in the dashboard front surface 12 to appear dark red and dark blue, respectively, thus marking the end positions to which lever 18 may be moved.

The various components of the lighted temperature indicator are readily molded from plastic material. For instances, the lens 53, filter 46 and the end pointer lens 62 are made of a clear acrylic plastic. The liner 72 is molded or extruded of mylar plastic. The slidable member and the housing 26 are molded nylon material.

While it is understood that the embodiment described in detail above and illustrated in the drawings is a preferred embodiment, other forms may be adapted. Specifically, an arrangement in which the light source and lens are stationary and a colored filter element moves therebetween with movements of the temperature control lever is contemplated.

What is claimed is as follows:

1. An automobile heating system with a lighted indicator for the temperature control whose color varies in response to the selected temperature setting comprising:

means for varying the temperature of air introduced into the automobile passenger compartment by the heating system;

a temperature selector lever operably connected to said air temperature varying means and with one end extending through a slot in the automobile dashboard for selecting a desirable temperature setting by movement of said lever along said slot;

an elongated housing mounted on the automobile dashboard extending parallel to said slot;

an elongated color light filter supported by said housing parallel to said slot with different colored portions arranged from one end to the other;

a light source behind said colored filter for projecting light therethrough toward the passenger compartment;

a lens aligned with said light source for focusing colored light transmitted through said filter from said light source;

a slidably mounted member in said housing supporting said light source and said lens on either side of said light filter and operably connected to said selector lever to cause said light source and said lens to move parallel to said slot and along said filter whereby a relatively bright colored light is produced adjacent said lever which changes color as said lever is moved along said slot;

an elongated stationary lens supported by said housing having a main portion extending generally parallel to said slot;

a leg portion on either end of said stationary lens extending normally from said main portion into said passenger compartment;

a second light source behind said stationary lens;

reflective surfaces aligned with said second light source for directing light toward said leg portions;

colored reflective surfaces at either end of said stationary lens for directing colored light into the passenger compartment through said leg portions thereby marking the ends of said slot.

* * * * *